(12) United States Patent
Liu

(10) Patent No.: US 9,176,836 B2
(45) Date of Patent: Nov. 3, 2015

(54) AUTOMATIC DIAGNOSIS SYSTEM AND METHOD THEREOF

(71) Applicant: Wistron NeWeb Corp., Hsinchu (TW)

(72) Inventor: I-Hsun Liu, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 160 days.

(21) Appl. No.: 14/015,474

(22) Filed: Aug. 30, 2013

(65) Prior Publication Data
US 2014/0359357 A1    Dec. 4, 2014

(30) Foreign Application Priority Data
May 31, 2013  (TW) .............................. 102119304 A

(51) Int. Cl.
*G06F 11/00*   (2006.01)
*G06F 11/22*   (2006.01)

(52) U.S. Cl.
CPC .................................. *G06F 11/2273* (2013.01)

(58) Field of Classification Search
CPC ............ G06F 11/2294; G06F 11/2236; G06F 11/0748
See application file for complete search history.

(56) References Cited

U.S. PATENT DOCUMENTS

| | | | | |
|---|---|---|---|---|
| 6,802,032 | B1 * | 10/2004 | Budinger | H04L 12/2697 709/221 |
| 6,990,591 | B1 * | 1/2006 | Pearson | H04L 29/06 726/22 |
| 7,159,021 | B2 * | 1/2007 | Boldman et al. | 709/223 |
| 7,225,245 | B2 * | 5/2007 | Gurumoorthy et al. | 709/223 |
| 7,712,131 | B1 * | 5/2010 | Lethe | 726/20 |
| 2006/0111861 | A1 * | 5/2006 | Horne | G01R 31/31905 702/89 |
| 2006/0143530 | A1 | 6/2006 | Largman et al. | |
| 2006/0242504 | A1 | 10/2006 | Kadota | |
| 2008/0072049 | A1 | 3/2008 | Cross et al. | |
| 2011/0313593 | A1 * | 12/2011 | Cohen et al. | 701/2 |

FOREIGN PATENT DOCUMENTS

| | | |
|---|---|---|
| TW | I255617 B | 5/2006 |
| TW | 201004217 A | 1/2010 |
| TW | I356992 B | 1/2012 |

OTHER PUBLICATIONS www.t3innovation.com Netprowler.*

* cited by examiner

*Primary Examiner* — Amine Riad
(74) *Attorney, Agent, or Firm* — Muncy, Geissler, Olds & Lowe, P.C.

(57) ABSTRACT

An automatic diagnosis method implemented by an automatic diagnosis system is provided. The automatic diagnosis system has a network device and a portable storage device. The method has the following steps of: detecting whether the portable storage device is plugged into a transmission interface of the network device; when it is detected that the portable storage device is plugged into the transmission interface of the network device, a system program is executed via the network device, so that the system program loads and executes a diagnosis program stored in the portable storage device; analyzing a network condition of the network device by the diagnosis program to generate a status report; and writing the generated status report to the portable storage device.

6 Claims, 3 Drawing Sheets

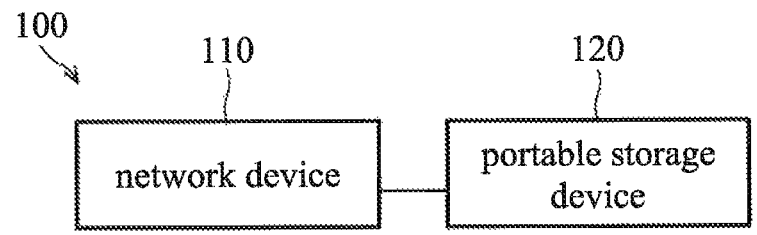
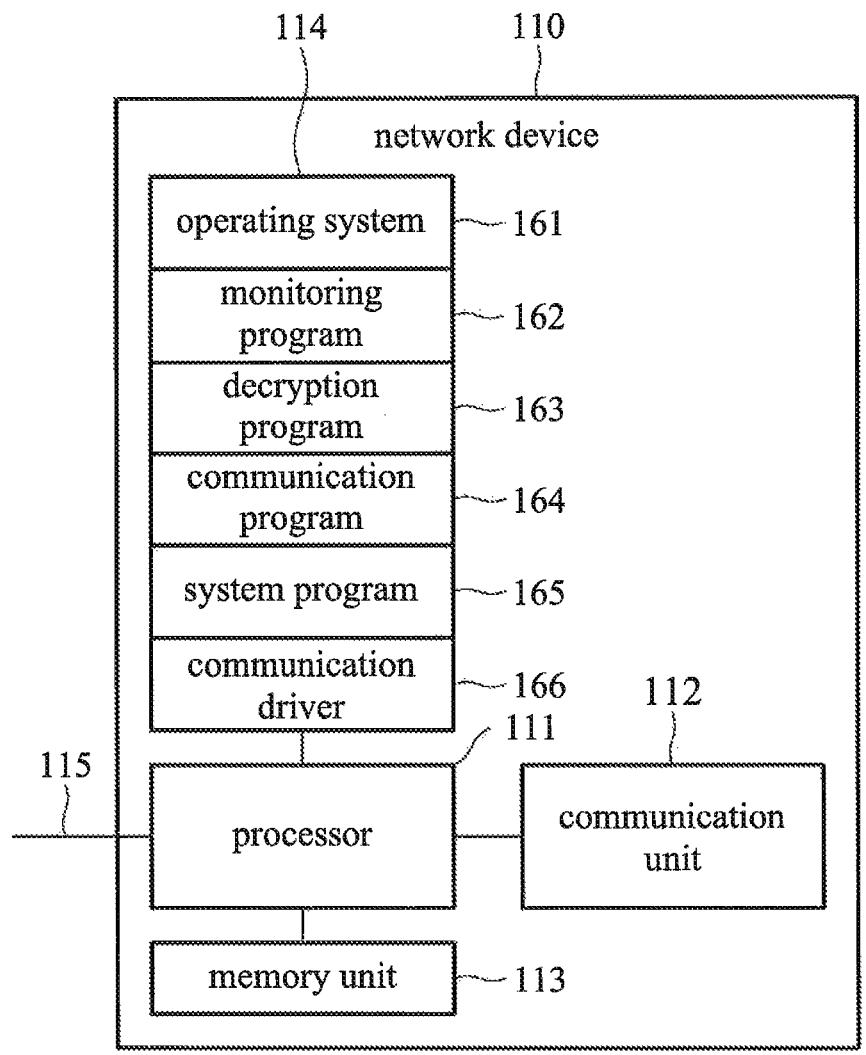

AUTOMATIC DIAGNOSIS SYSTEM AND METHOD THEREOF

CROSS REFERENCE TO RELATED APPLICATIONS

This Application claims priority of Taiwan Patent Application No. 102119304, filed on May 31, 2013, the entirety of which is incorporated by reference herein.

BACKGROUND OF THE INVENTION

1. Field of the Invention

The present invention relates to an automatic diagnosis system, and in particular, to an automatic diagnosis system and automatic diagnosis method capable of performing system diagnosis automatically when a portable storage device is plugged into the automatic diagnosis system.

2. Description of the Related Art

Currently, a network in a good condition is required for performing troubleshooting and diagnosis on a network device. However, when some issues happen to the network of the network device, the manufacturer of the network device cannot log onto the network device via remote connection (e.g. via telnet, SSH, SNMP or TR069 protocols) after the user has reported the network issues to the manufacturer. In other words, the manufacturer has to overcome the network issues happening to the network device via other ways. Accordingly, there is a high demand for an automatic diagnosis system capable of performing diagnosis to the network device via a portable storage device (e.g. a USB storage device).

BRIEF SUMMARY OF THE INVENTION

A detailed description is given in the following embodiments with reference to the accompanying drawings.

In an exemplary embodiment, an automatic diagnosis method implemented by an automatic diagnosis system is provided. The automatic diagnosis system has a network device and a portable storage device. The method has the following steps of: detecting whether the portable storage device is plugged into a transmission interface of the network device; when it is detected that the portable storage device is plugged into the transmission interface of the network device, executing a system program via the network device, so that the system program loads and executes a diagnosis program stored in the portable storage device; analyzing a network condition of the network device by the diagnosis program to generate a status report; and writing the generated status report to the portable storage device.

In another exemplary embodiment, an automatic diagnosis system is provided. The automatic diagnosis system comprises: a network device and a portable storage device. The network device comprises: a processor; a memory unit; a storage unit configured to store a system program; and a transmission interface, wherein the processor detects whether the portable storage device is plugged into the transmission interface. When it detected that the portable storage device is plugged into the transmission interface, the processor executes the system program, so that the system program loads and executes a diagnosis program stored in the portable storage device, wherein the processor further executes the diagnosis program to analyze a network condition of the network device to generate a status report, and writes the generated status report to the portable storage device.

BRIEF DESCRIPTION OF THE DRAWINGS

The present invention can be more fully understood by reading the subsequent detailed description and examples with references made to the accompanying drawings, wherein:

FIG. 1A is a schematic block diagram of an automatic diagnosis system according to an embodiment of the invention;

FIG. 1B is a schematic block diagram of a network device 110 according to an embodiment of the invention;

DETAILED DESCRIPTION OF THE INVENTION

Figure 1C:
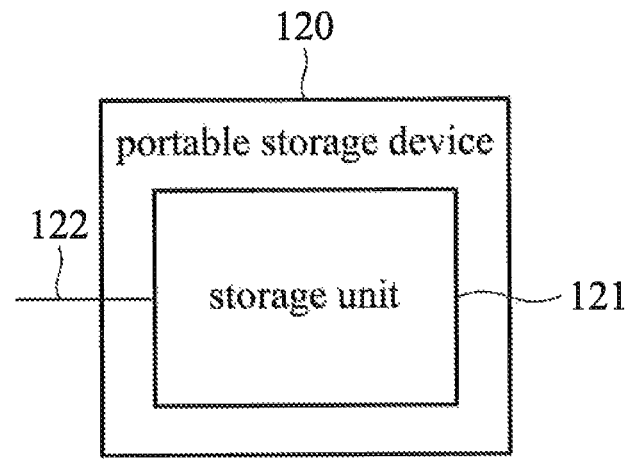
FIG. 1C is a schematic block diagram of a portable storage device according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

FIG. 1A is a schematic block diagram of an automatic diagnosis system according to an embodiment of the invention. As illustrated in FIG. 1A, the automatic diagnosis 100 may comprise a network device 110, and a portable storage device 120. FIG. 1B is a schematic block diagram of the network device 110 according to an embodiment of the invention. In an embodiment, the network 110 may be a router, an IP sharer, a wireless communication apparatus, or a network server, but the invention is not limited thereto. The network device 110 may comprise a processor 111, a communication unit 112, a memory unit 113, a storage unit 114, and a transmission interface 115. In an embodiment, the communication unit 112 is configured to execute operations associated with network transmission, and the communication unit 112 is capable of connecting to a debug server (e.g. provided by the manufacturer of the network device 110) through the internet via a wired/wireless network. The memory unit 113 may be a volatile memory, such as a random access memory (e.g. SRAM or DRAM), but the invention is not limited thereto. The storage unit 114 is configured to store an operating system 161, a monitoring program 162, a decryption program 163, a communication program 164, a system program 165, and a communication driver 166. The storage unit 114 may be a non-volatile memory, such as a hard disk, flash memory, ROM, or EEPROM, but the invention is not limited thereto. In an embodiment, the transmission interface 115 may be an interface compatible with the Universal Serial Bus (USB) 2.0 or 3.0 specification, or compatible with the IEEE1394 or SATA standard, which supports "hot-plugging" functions.

FIG. 1C is a schematic block diagram of a portable storage device according to an embodiment of the invention. For example, the portable storage device 120 may comprise a storage unit 121 and a transmission interface 122, wherein the storage unit 121 may be a non-volatile memory, such as a hard disk, flash memory, ROM, EEPROM, but the invention is not limited thereto. Specifically, the transmission interface 122 of the portable storage device 120 is compatible with the transmission interface 115 of the network device 110 (e.g. USB 3.0 has backward compatibility with USB 2.0).

For example, the operating system 161 may be a Linux operation system, a Windows operating system, or an embedded operating system. The processor 111 may execute the operating system 161 as an operation platform, and execute other programs stored in the storage unit 114. The monitoring program 162 is configured to consistently detect whether any portable storage device 120 is plugged into the transmission interface 115, and detect whether any diagnosis program 121 is stored in the plugged portable storage device 120. When it is detected that the diagnosis program 121 is stored in the plugged portable storage device 120, the monitoring program 162 may call up the decryption program 163 to decrypt the diagnosis program 121 and verify whether there is a qualified authorization of the diagnosis program 121 (e.g. the diagnosis program 121 should be provided by the manufacturer of the network device 110). When authorization of the diagnosis program 121 is qualified, the decryption 163 may further call up the system program 165, and the system program 165 may load the diagnosis program 121 into the memory unit 113 and read the program codes and data in the diagnosis program 121. The communication driver 166 is configured to handle settings of the communication unit 112 and control the operations and data transmission of the communication unit 112. In another embodiment, the monitoring program 162 and the decryption program 163 can be integrated into a security program, which is capable of detecting whether the portable storage device 120 is plugged into the transmission interface 115, and performing decryption and verification operations.

Figure 2:
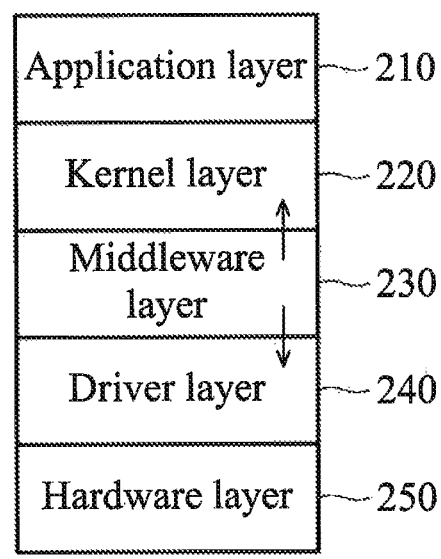
FIG. 2 is a diagram strafing a system model of the network device 110 according to an embodiment of the invention.

FIG. 2 is a diagram illustrating a system model of the network device 110 according to an embodiment of the invention. In an embodiment, the diagnosis program 121 may be a dynamic-link library (DLL) file, such as an so, dll, ocx, or drv file. The program codes and data stored in the diagnosis program 121 are configured to control the processor 111 to retrieve setting values and associated data of the communication unit 112 from the communication driver 166 and the system kernel (e.g. the operating system 161). Briefly, as illustrated in FIG. 2, the diagnosis program 121 can be regarded as middleware, such as the middleware layer 230. The operation of the middleware layer 230 is between the driver layer 240 and the kernel layer 220. Accordingly, the diagnosis program 121 may manage the interaction between the application layer 210, the kernel layer 220, and the driver layer 240 (i.e. capable of controlling the hardware layer 250). Specifically, after the system program 165 has loaded and executed the diagnosis program 121, the processor 111 may retrieve the current network settings and the status of the hardware of the network device 110, and generate a status report according to the retrieved data, and store the generated status report in the memory unit 113. Then, the processor 111 may copy the status report stored in the memory unit 113 to the portable storage device 120. When the status report has been copied, the processor 111 may further display a notification message to a display unit (not shown) of the network device, thereby notifying the user of completion of diagnosis.

In the embodiment, the status report may comprise network settings (e.g. TCP/IP settings, DHCP settings) of the network device 110, and/or the network conditions (e.g. connection report of the tracing-route command) analyzed by the diagnosis program 121, but the invention is not limited thereto. Accordingly, when the status report has been stored into the portable storage device 120, the user may provide the status report stored in the portable storage device 120 to the associated manufacturer of the network device 110, thereby allowing the associated manufacturer to analyze the network issues.

In another embodiment, the diagnosis program 121 may be further configured to analyze the network conditions of the network device 110 and perform corresponding operations, such as adjusting associated network settings, rebooting the network device 110, or restoring network settings of the network device 110 to the factory default settings. Specifically, when a network issue (e.g. unstable transmission speed, network disconnection, or packet loss) happens to the network device 110, the user may utilize the diagnosis program 121 provided by the manufacturer of the network device 110 to diagnose the network condition, and fix the network issue in response to the results of the diagnosis.

Figure 3:
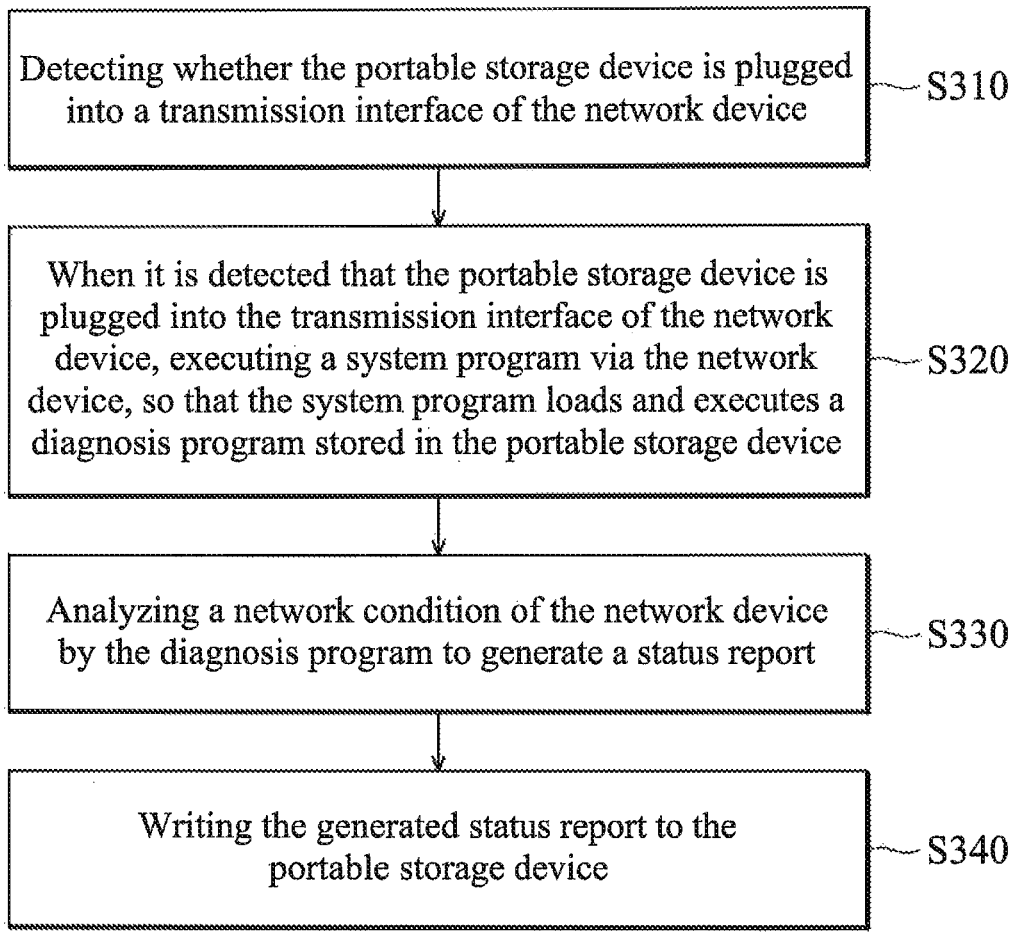
FIG. 3 is a flow chart of an automatic diagnosis method implemented by the automatic diagnosis system 100 according to an embodiment of the invention.

FIG. 3 is a flow chart of an automatic diagnosis method implemented by the automatic diagnosis system 100 according to an embodiment of the invention. Referring to both FIG. 1 and FIG. 3, in step S310, the processor 111 (e.g. executing the monitoring program 162) may detect whether the portable storage device 120 is plugged into the transmission interface 115 of the network device 110. In step S320, when it is detected that the portable storage device 120 is plugged into the transmission interface of the network device 110, the network device may execute the system program 165, so that the system program 165 may load and execute the diagnosis program 121 stored in the portable storage device 120. In step S330, the diagnosis program 121 executed by the processor 111 may analyze the network condition of the network device 110 to generate a status report (e.g. stored in the memory unit 113 of the network device 110). In step S340, the processor 111 may write the generated status report to the portable storage device 120.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic diagnosis method implemented by an automatic diagnosis system, wherein the automatic diagnosis system comprises a network device and a portable storage device, the automatic diagnosis method comprising:
   detecting whether the portable storage device is plugged into a transmission interface of the network device;
   when it is detected that the portable storage device is plugged into the transmission interface of the network device, executing a system program via the network device, so that the system program loads and executes a diagnosis program stored in the portable storage device;
   analyzing a network condition of the network device by the diagnosis program to generate a status report;
   writing the generated status report to the portable storage device; and
   utilizing the diagnosis program to diagnose the network condition and fix network issues in response to results of the diagnosis, wherein a system model of the network device comprises an application layer, a kernel layer, a middleware layer, and a driver layer, and the diagnosis program is a dynamic-link library file in the middleware layer, which is between the driver layer and the kernel layer, and the diagnosis program manages the driver layer and the kernel layer.

2. The method as claimed in claim 1, wherein before loading and executing the diagnosis program, the method further comprises:

detecting whether the portable storage device has stored the diagnosis program, and qualifying authorization of the diagnosis program; and when the authorization of the diagnosis program is qualified, decrypting the diagnosis program.

3. The method as claimed in claim 1, wherein the status report comprises multiple network settings and/or the analyzed network condition of the network device.

4. An automatic diagnosis system, comprising:
a network device comprising:
a processor;
a memory unit;
a storage unit configured to store a system program; and
a transmission interface; and
a portable storage device,
wherein the processor detects whether the portable storage device is plugged into the transmission interface,
wherein when it detected that the portable storage device is plugged into the transmission interface, the processor executes the system program, so that the system program loads and executes a diagnosis program stored in the portable storage device, and
wherein the processor further executes the diagnosis program to analyze a network condition of the network device to generate a status report, and writes the generated status report to the portable storage device,
wherein the processor utilizes the diagnosis program to diagnose the network condition and fix network issues in response to results of the diagnosis,
wherein a system model of the network device comprises an application layer, a kernel layer, a middleware layer, and a driver layer, and the diagnosis program is a dynamic-link library file in the middleware layer, which is between the driver layer and the kernel layer, and the diagnosis program manages the driver layer and the kernel layer.

5. The automatic diagnosis system as claimed in claim 4, wherein before loading and executing the diagnosis program, the processor further detects whether the portable storage device has stored the diagnosis program,
wherein when it is detected that the diagnosis program has been stored in the portable storage device, the processor further qualifies authorization of the diagnosis program, and
wherein when the authorization of the diagnosis program is qualified, the processor further decrypts the diagnosis program.

6. The automatic diagnosis system in claim 4, wherein the status report further comprises multiple network settings and/or the analyzed network condition of the network device.

* * * * *